United States Patent [19]
Dietrich

[11] Patent Number: 5,659,926
[45] Date of Patent: Aug. 26, 1997

[54] TRAILER DOOR ROLLER REINSERTION BRACKET

[76] Inventor: Timothy R. Dietrich, 22995 W. Silver Spring Dr., Sussex, Wis. 53089

[21] Appl. No.: 574,447

[22] Filed: Dec. 15, 1995

[51] Int. Cl.⁶ ............................. A47H 1/04; A47H 15/00
[52] U.S. Cl. ..................... 16/94 R; 160/201; 49/197
[58] Field of Search ..................... 16/94 R, 90, 95 R, 16/96 R, DIG. 1, 87 R; 160/201, 206, 207; 49/197, 199, 200

[56] References Cited

U.S. PATENT DOCUMENTS

| | | |
|---|---|---|
| 3,118,702 | 1/1964 | Kale et al. . |
| 3,443,340 | 5/1969 | Helmick et al. . |
| 4,156,953 | 6/1979 | Alten . |
| 4,572,268 | 2/1986 | Wentzel ........................... 160/201 |
| 4,800,618 | 1/1989 | Putz . |
| 4,800,619 | 1/1989 | Hudak . |
| 4,905,345 | 3/1990 | Lumenschloss et al. . |
| 5,495,640 | 3/1996 | Mullet et al. ..................... 160/201 |

FOREIGN PATENT DOCUMENTS

| | | | |
|---|---|---|---|
| 476788A | 3/1992 | European Pat. Off. ........ | 49/197 |

*Primary Examiner*—Chuck Y. Mah
*Attorney, Agent, or Firm*—Andrus, Sceales, Starke & Sawall

[57] ABSTRACT

A system for reinserting a dislodged roller of a movable overhead door and a bracket for accomplishing this result. A reinsertion bracket is positioned along both the vertical and horizontal portion of each side of a door track. The reinsertion bracket consists of a base plate and a pair of guide plates connected to the base plate at an acute angle. When a roller becomes dislodged from the wheel track, the forward or reverse movement of the overhead door will cause the roller and shaft to contact one of the guide plates of the reinsertion bracket. The guide plate contains a roller guide surface which directs the disengaged roller upward and inward until it is reinserted into the door track through a removed portion of the retaining ridge of the door track. The reinsertion bracket is resiliently mounted to the door track such that when a dislodged roller contacts the guide plate, the reinsertion bracket can flex to reinsert the roller within the door track.

25 Claims, 2 Drawing Sheets

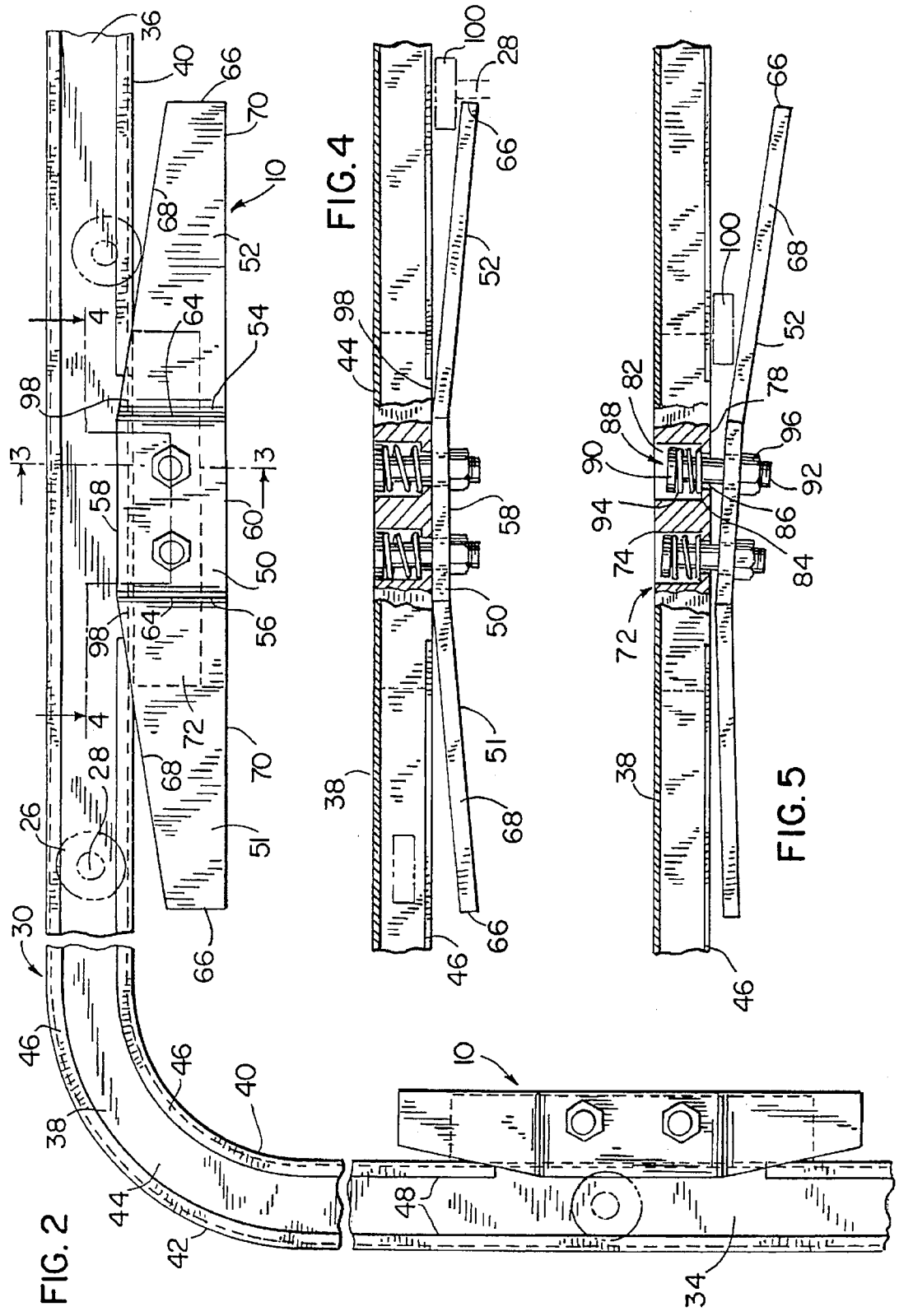

TRAILER DOOR ROLLER REINSERTION BRACKET

FIELD OF THE INVENTION

This invention relates to an apparatus for use with a movable overhead door and more particularly to an externally mounted bracket assembly to reinsert a dislodged roller into a door track of an overhead door.

BACKGROUND OF THE INVENTION

Large truck trailers and many garages contain an overhead door constructed from longitudinal panels joined together and supported by rollers that ride in a pair of door tracks. The door tracks typically are positioned on the outer walls of the door opening and extend vertically upward from the floor of the opening to the top of the opening, where they then extend backward in a horizontal direction slightly below the roof of the enclosure. A door track for use with this type of overhead door usually has a ridge or overhang extending from each of its edge surfaces to prevent the door rollers contained within the door track from becoming dislodged. During normal operation, the rollers of the overhead door travel within the door track and allow the door to be easily moved from its closed vertical position to an open horizontal position where the entire door is supported by the horizontal section of the door track.

While this type of overhead door works very well and is widely used, several problems can occur which cause the door rollers to become dislodged from the door track. For example, problems can occur if the door track somehow becomes deformed by either continuous use or as a result of a violent act, such as a piece of cargo contained within the truck trailer striking the door track. If the track is deformed, when a roller passes the deformed portion of the track, the roller will oftentimes become dislodged from the track. With a roller dislodged from the track, the overhead door will often become jammed and therefore be nearly inoperable. Fixing this situation is often a very difficult process, since the dislodged roller must somehow be forced back into the strong metal door track which, because of the overhang, has an opening smaller than the diameter of the dislodged roller. In many cases, the trailer has to be brought into a repair shop where there are proper tools to reinsert the dislodged roller, which is obviously a large inconvenience.

Along with the rigidity of the door track, other problems may also stem from the position at which the roller is located when it becomes dislodged. Since many garage doors and overhead trailer doors are often 8 to 9 feet in height, it can be very difficult to get into a position the work on the dislodged roller if the roller or the track area to be repaired are at such heights. Further adding to the problem, many overhead doors weight several hundred pounds and are therefore very hard to move.

Another cause of problems, particularly with an overhead door of a truck trailer, is that a roller may become dislodged when the truck trailer travels over a large bump or hole in the pavement. The sudden vibration or shock to the trailer can cause one or several of the door rollers to become dislodged from the door track. With a roller dislodged, it becomes very difficult to move the trailer door in either an upward or a downward direction, thus disrupting many loading or unloading schedule for the trailer.

Therefore, it can be appreciated that an assembly that would reinsert an overhead door roller which has become disengaged from the door track would be desirable, especially for use with a truck, trailer or garage door assembly.

SUMMARY OF THE INVENTION

The invention is a reinsertion bracket and system for reinserting a dislodged roller of a movable overhead door which has a plurality of rollers positioned within a door track.

The general object of the invention is to provide a roller reinsertion assembly that can be permanently mounted to a door track of an overhead door which, during normal operation of the door, will reinsert any roller which has become dislodged for various reasons. Another object of the invention is to provide such a bracket and system to reinsert a dislodged roller which can be easily installed on existing door structures. A further object of the invention is to provide a system of brackets which are positioned along an existing door track, such that when any of the rollers of an overhead door become disengaged, the system of brackets work in combination to reinsert the rollers within the door track.

In accordance with one aspect of the invention, a reinsertion bracket includes a body consisting of a base plate and either one or a pair of connected guide plates. Each guide plate has an attachment end and a contact end, such that the attachment end of each guide plate is joined to opposite ends of the base plate. Each guide plate further defines a roller guide surface which angles upward from the contact end to the attachment end. The base plate extends along a plane parallel to the back wall of the door track, while each of the pair of guide plates extend along separate planes which form an acute angle with the plane containing the base plate. Due to the angled roller guide surface and the acute angle between the base plate and the guide plates, the contact end of each guide plate is spaced both in the vertical and the horizontal direction from the inside wall of the door track.

The base plate has a pair of mounting holes located between its top and bottom edge surfaces. The reinsertion bracket, consisting of the base plate and a pair of guide plates, is resiliently positioned with respect to the door track by a mounting block and a pair of mounting elements which pass through the mounting holes contained in the base plate. The mounting block has a pair of removed mounting element receptacles which receive a head portion of the mounting elements. A shaft portion of the mounting elements passes through removed portions of the mounting block and the mounting holes in the base plate. Further, a pair of springs are contained within the mounting element receptacles and surround the shaft portion of the mounting elements, such that the combination of the mounting block, the mounting elements, and the pair of springs form a resilient mounting structure for mounting the reinsertion bracket to the door track. The mounting block is located adjacent the inside wall of the wheel track, such that the top edge of the base plate extends past the inside wall of the door track.

The door track further includes a pair of retaining ridges or lips interconnected with both the inside and exterior walls and extending toward each other, such that the distance between the retaining ridges is less than the diameter of the rollers. Therefore, the retaining ridges act to securely hold the rollers within the door track during normal operation. A portion of the inside wall retaining ridge is removed at a location adjacent to the top edge of the base plate, which extends past the inside wall of the door track, to define an opening in the retaining ridge.

To reinsert a disengaged roller back into the door track, the overhead door is moved in the proper direction such that the roller, or the shaft which connects the roller to the overhead door, will contact the contact end of the corresponding guide plate. Upon contact with the contact end of the guide plate, the shaft travels upward and inward along the roller guide surface of the corresponding guide plate. During the movement of the shaft along the roller guide surface, the resilient mounting structure, consisting of the mounting block, mounting elements and springs, allows the reinsertion bracket to flex outward, thereby allowing the disengaged roller and shaft to continue to move upward and inward along the roller guide surface. The continued movement of the overhead door will move the disengaged roller and shaft into a position such that the roller will re-enter the door track through the opening defined by the removed portion of the retaining ridge. Once the wheel has been reinserted, the resilient mounting elements return the reinsertion bracket to its original, at-rest position, in which the base plate is parallel to the back wall of the door track.

The system for reinserting a dislodged roller consists of an overhead door with a pair of outer edge surfaces which are parallel to the direction of the door movement. Each of these edge surfaces has a series of rollers positioned along its overall length. The rollers positioned along the overall length of the overhead door are contained within a pair of door tracks positioned on each side of the overhead door. These door tracks extend along each of the vertical walls which define the door opening and extend backward along the top of each vertical wall, slightly below the overhead roof. Preferably, a first pair of the insertion brackets are positioned such that one insertion bracket is located on the horizontal section of each door track. Additionally, a second pair of the insertion brackets are selectively positioned such that one insertion bracket is located on the vertical section of each door track. By positioning the reinsertion brackets as such, the system can effectively reinsert any roller of the overhead door which becomes disengaged.

The invention further contemplates a series of variations to the reinsertion bracket substantially in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 2 is a partial side elevation view of a door track with the reinsertion bracket attached in both a horizontal and vertical position;

FIG. 4 is a top partial sectional view of the door track and reinsertion bracket assembly taken along line 4—4 of FIG. 2; and FIG. 5 is a top partial sectional view of the door track and reinsertion bracket assembly similar to FIG. 4, showing its operation in reinserting a disengaged roller.

DETAILED DESCRIPTION OF THE INVENTION

Figure 1:
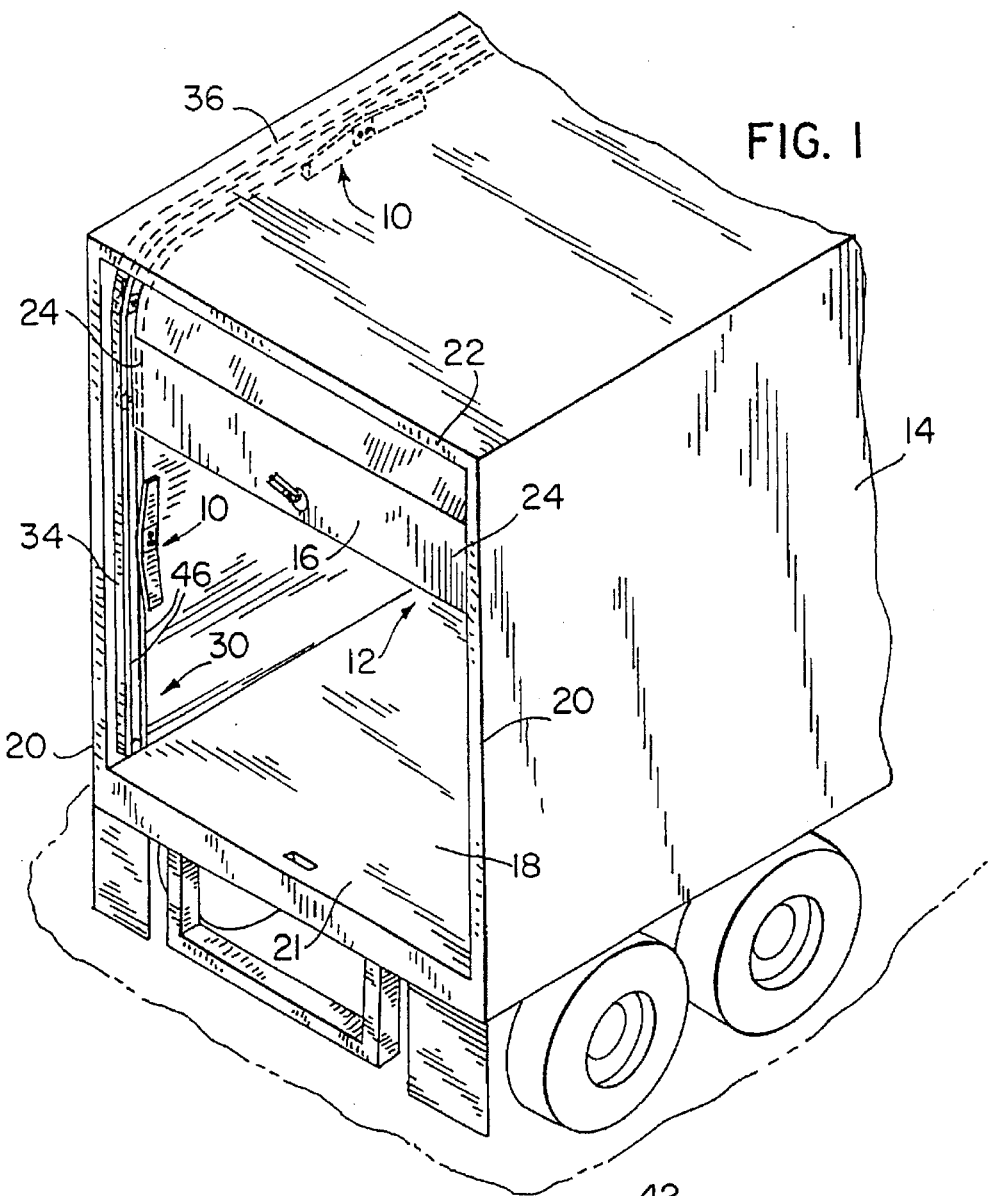
FIG. 1 is a partial isometric view of a truck trailer and overhead door assembly employing the reinsertion bracket of the invention.

Referring to the drawings, the reinsertion bracket of the invention is generally designated by reference numeral 10.

FIG. 1 illustrates an overhead door 12 as used in the back end of a truck trailer 14. The overhead door 12 is comprised of a series of lateral panels 16 joined together to create a movable overhead door. The overhead door 12 is positioned such that it closes a door opening 18 defined by a pair of outer walls 20, a floor 21, and an overhead roof 22. The overhead door 12 has a pair of lateral edge surfaces 24 which extend parallel to the direction of movement of the door 12. Each of the lateral edge surfaces 24 contains a series of rollers 26 spaced along its length and attached to the overhead door 12 by a series of shafts 28. The shafts 28 are mounted to the interior surface of the overhead door 12 by a securely attached mounting bracket, not shown. Each of the rollers 26 is rotatable about the shaft 28 and positioned within a door track 30.

Each door track 30 is constructed such that it extends upward from the floor 21 of the door opening 18 along the interior surface of the exterior wall 20 until it reaches a position slightly below the roof 22 of the enclosure. Upon reaching an area near the roof 22, the door track is bent to create a curved portion and continues in a direction parallel to the roof 22. As shown in FIG. 2, the vertical portion 34 of the door track and the horizontal portion 36 of the door track 36 are joined by a curved corner section 38. Although only one door track 30 is shown in FIG. 1, an identical door track structure is positioned along the interior of the opposite outer wall 20, such that the rollers 26 connected on each lateral edge 24 are positioned within a door track 30. In this manner, the rollers 26 travel within the door track 30 and enable the overhead door 12 to move from a vertical, closed position to a horizontal, open position.

Figure 3:
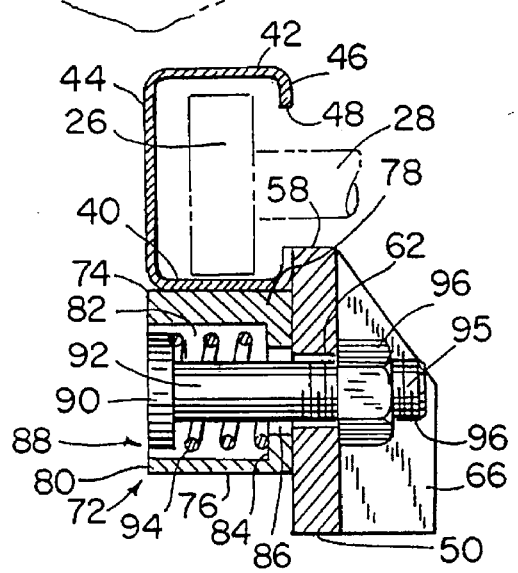
FIG. 3 is a detailed sectional view of the door track and reinsertion bracket assembly taken along line 3—3 of FIG. 2.

As can best be seen in FIG. 3, the door track 30 has a generally C-shaped cross-section comprised of an inside wall surface 40, an exterior wall surface 42, a back wall 44, and a pair of retaining ridges 46. In an alternate embodiment, the door track 30 may only have a single retaining ridge 46 connected to the inside wall surface 40. When the door track 30 is installed within a suitable enclosure, such as a garage or truck trailer shown in FIG. 1, the inside wall 40 faces toward the interior of the enclosure in both the vertical section 34 and the horizontal section 36. The exterior wall 42 faces toward the exterior of the enclosure in the vertical portion 34 and toward the roof 22 in the horizontal portion 36. At all locations, the back wall 44 of the door track 30 is in contact with or in close proximity to the outer wall 20 of the enclosure. Although not shown in the figures, the door track 30 typically includes a suitable conventional mounting section which is used to attach the door track to the outer wall 20.

Referring again to FIG. 3, it can be seen that the internal distance between the inside wall 40 and the exterior wall 42 of the door track is slightly larger than the diameter of the roller 26. This size difference permits the rollers 26 to move freely within the door track 30. In the horizontal section 36 of the door track 30, the rollers 26 are in contact with the inside wall 40 due to the force of gravity acting on the overhead door 12 in its horizontal position. When the door 12 is in the vertical position, the rollers 26 are no longer forced into contact with either the inside wall 40 or the exterior wall 42 by the force of gravity.

As shown in FIGS. 2 and 3, the pair of retaining ridges 46 extend from both the inside wall 40 and the exterior wall 42 in a direction parallel to the back wall 44. The distance between the edge surfaces 48 of the retaining ridges 46 is less than the diameter of the rollers 26. Since this distance is less than the diameter of the rollers 26, the retaining ridges 46 act to prevent the rollers from leaving the internal space defined by the door track 30. As can be seen in FIG. 2, the retaining ridges 46 extend over the entire length of the door track 30 to securely hold the rollers 26 within the interior of the door track.

Referring to FIG. 2, the reinsertion bracket 10 consists of a base plate 50 and a pair of guide plates 51, 52. The base plate 50 has a first end 54, a second end 56, a top edge surface 58 and a bottom edge surface 60. The combination of the first end 54, second end 56, top edge 58 and bottom edge 60 define a generally flat, rectangular section lying in a first plane. The base plate 50 further includes a pair of mounting holes 62 (FIG. 3) located between the top and bottom edge surfaces of the base plate 50.

The pair of guide plates 51, 52 each have an attachment end 64. As shown in FIG. 2, the attachment end 64 of guide plate 51 is joined to the second end 56 of base plate 50 while the attachment end 64 of guide plate 52 is joined to the first end 54 of the base plate 50. The guide plates 51, 52 each further have a contact end 66, a roller guide surface 68 and a bottom edge 70. The overall height of the attachment end 64 of each guide plate 51, 52 is equal to the height of the base plate 50, while the height of the contact end 66 is less than the height of the base plate 50. As shown in FIG. 2, the bottom edge 70 of the guide plates 51, 52 and the bottom edge 60 of the base plate 50 are contained in the same plane, such that the bottom edge of the entire reinsertion bracket 10 creates a generally flat surface. Therefore, the difference in height between the contact end 66 and the attachment end 64 creates a roller guide surface 68 angled from the contact end 66 to the attachment end 64 of the guide plate, the significance of which will be described in detail below.

As can best be seen in FIG. 4, the first plane containing the base plate 50 is generally parallel to the back wall 44 of the door track 30. The guide plates 51 and 52 are both generally flat, planar, metallic elements. The second plane containing the guide plate 51 forms an acute angle with the first plane containing the base plate 50, while the third plane containing the second guide element 52 also forms an acute angle with the first plane containing the base plate 50. When viewed from above, the guide plates 51, 52 appear to be bent outward from the door track 31. In the preferred embodiment of the invention, the acute angles formed between each guide plate 51, 52 and the plane containing the base plate 50 are substantially equal, and are approximately 15°. The thickness of the roller guide surface 68 and the thickness of the top edge 58 are equal, such that the overall thickness of the reinsertion bracket is uniform throughout. In the preferred construction of the reinsertion bracket 10, the pair of guide plates 51 and 52, along with the base plate 54 are formed from quarter inch thick steel.

A mounting block 72 is used to position the reinsertion bracket 10 in its proper operating position shown in FIG. 3. The mounting block 72 has a top surface 74, a bottom surface 76, a bracket contact surface 78, and a support contact surface 80. As can best be seen in FIGS. 2 and 4, the longitudinal length of the mounting block 72, as shown by the phantom lines, is greater than the width of the base plate 50, while less than the length of the overall reinsertion bracket 10. The mounting block 72 is securely positioned adjacent the inside edge 40 of the door track 30 in any suitable manner, such as by a pair of screws or bolts, or by a weld. Mounting block 72 contains a pair of mounting element receptacles 82 which are cylindrical removed sections of the mounting block 72 extending inward from the support contact surface 80. The mounting element receptacles 82 terminate slightly before the bracket contact surface 78 at a shoulder 84. Shoulder 84 defines an annular ring surrounding an aperture 86 which extends between receptacle 82 and bracket contact surface 78. The mounting element receptacles 82 and the apertures 86 combine to create an opening extending between the bracket contact surface 78 and the support contact surface 80. As shown in FIG. 3, the aperture 86 and the mounting element receptacles 82 are axially aligned With the mounting hole 62 contained in the base plate 50.

One of a pair of mounting elements 88 is contained within each of the mounting element receptacles 82. Each of the mounting elements 88 consists of a head portion 90 and a shaft portion 92. The shaft portion 92 passes through both the aperture 86 of the mounting block 72 and the corresponding mounting hole 62 contained in the base plate 50. As can be seen in FIG. 3, the diameter of the shaft 92 is less than the diameter of both the aperture 86 and the mounting hole 62, while the head portion 90 is of a diameter larger than either of these two openings.

As shown in FIG. 3, a spring 94 is positioned within each mounting element receptacle 82 and surrounds the shaft 92 of the mounting element 88. The diameter of the spring is selected such that one end of the spring 94 contacts the underside of the head portion 90 of the mounting element 88, while the second end of the spring 94 contacts the shoulder 84 surrounding the aperture 86. In the preferred embodiment of the invention, the mounting elements 88 are comprised of a pair of bolts having threads 95 formed on an end portion of shaft 92. A securing means, such as a nut 96, is used in combination with the mounting element 88 to securely attach the base plate 50 to the bracket contact surface 78 of the mounting block 72. When the nut 96 is tightened on threads 95, spring 94 is compressed until the compression force provided by the spring 94 is adequate to support the reinsertion bracket 10. As can be appreciated by FIGS. 3 and 4, the spring 94 positioned around the shaft 92 provides a resilient mounting connection between the base plate 50 and the mounting block 72, a feature which will be greatly appreciated as described below.

As is further shown in FIGS. 2 and 3, the top edge 58 of the base plate, and a portion of the roller guide surfaces 68, extend past the inside wall 40 of the door track 30 when the reinsertion bracket 10 is installed as shown. A portion of the retaining ridge 46 connected to the inside wall 40 of the door track 30 is removed at a location directly adjacent to the portion of the top edge 58 of the base plate 50 extending past the inside edge 40. This removed portion of retaining ridge 46 defines a gap 98 in the retaining ridge 46, which allows a disengaged roller 26 to reenter the door track 30 in a manner which will be described in detail below.

In the preferred embodiment of the invention, a reinsertion bracket 10 is connected to both the horizontal portion 36 and the vertical portion 34 of the door track 30, as shown in FIG. 2. As can be appreciated in the figure, the overall length of the reinsertion bracket 10 positioned along the horizontal portion 36 is greater than the overall length of the reinsertion bracket 10 positioned along the vertical portion 34. This difference in overall length is driven by the effect gravity has on a dislodged roller in the horizontal section 36 of the door track. In the horizontal section 36, a dislodged roller will drop a given distance below the inside track wall 40 due to gravity, while in the vertical section 34, a dislodged roller will remain closer to the inside wall 40. Therefore, the increased length of the horizontal reinsertion bracket 10 positions the contact end 66 further away from the inside wall 40 than is needed in the vertical position. Additionally, due to the force of gravity operation on the horizontally mounted reinsertion bracket 10, this bracket is greater in size to support the weight of the door. In the vertical position, the bracket does not need to support the door weight, but only acts as a guide to reposition the rollers. Besides the length difference between the two brackets, the operation and the overall construction of each bracket and its attachment to the door track 30 is identical.

Referring now to FIGS. 4 and 5, the operation of the invention will now be described. During normal operation of an overhead trailer door, the rollers 26 travel in the door track 30 and are securely held therein by the retaining ridges 46. During this normal operation, the overhead door 12 can travel smoothly and easily from its closed, vertical position to an open, horizontal position. When the overhead door 12 is in its open position, a majority of the rollers 26 are contained within the horizontal portion 36 of the door track 30 and are located behind the reinsertion bracket 10 mounted on the horizontal portion 36. However, several rollers connected near the lower end of the door 12 will be positioned in the curved corner section 38 when the door is in its completely open position and therefore would not travel past the single horizontal reinsertion bracket 10. Because of this, in the preferred embodiment of the invention, a pair of reinsertion brackets 10 are connected to each of the door tracks positioned along the lateral edges of the overhead door 12. The reinsertion bracket 10 positioned along the vertical section 34 is installed to reinsert any one of the lower rollers which never pass the bracket connected on the horizontal section 36.

Shown in FIG. 4 is the situation where a roller 26 has become disengaged from the door track 30. In this figure, the disengaged roller, shown at 100, is displaced from the door tracks toward the interior of the enclosure as viewed from above. With a roller in such a position, the overhead door 12 will often become jammed and rather difficult to operate. In the past, the trailer 14 would have to be brought into the shop to have the door assembly fixed by a mechanic.

Reinserting a dislodged roller 100 using the reinsertion bracket 10 of the invention occurs as follows. When the roller becomes dislodged, the user of the overhead door identifies the position of the dislodged roller with respect to the reinsertion bracket 10. As shown in FIG. 4, the dislodged roller 100 is located on the side of the base plate 50 containing the guide plate 52. With the position identified, the user will now have to move the overhead door downward, such that the dislodged roller 100 moves toward the base plate 50. The downward movement of the overhead door 12 causes the dislodged roller 100 to travel toward the base plate 50 until the roller shaft 28 meets the contact end 66 of the guide plate 52. As can be seen in FIGS. 2 and 4, the contact end 66 is positioned below the inside wall 40 of the horizontal portion 36 of the door track 30 and toward the interior of the enclosure (FIG. 4). The reason for positioning the contact end 66 in such a manner is that when a roller 26 becomes dislodged from the door track 30, the overall weight of the overhead door 12 causes the dislodged roller 100 to sag below the inside wall 40 of the wheel track 30. Since the contact end 66 is located both below and inward from the inside wall 40, the contact end 66 will meet the shaft 28 rather than the roller 100.

Once the shaft 28 of the dislodged roller 100 contacts the contact end 66, the further downward movement of the overhead door 12 will cause the shaft 28 to move along the roller guide surface 68. Since the roller guide surface 68 is angled upward from the contact end 66 to the attachment end 64, the movement of the shaft 28 along the roller guide surface 68 will move the dislodged roller 100 in both an upward direction and an inward direction toward the door track 30.

Referring now to FIG. 5, when the dislodged roller 100 moves far enough along the roller guide surface 68, it will contact the retaining ridge 46 connected to the inside wall 40 of the wheel track 30. When this occurs, the springs 94 surrounding the mounting elements 88 further compress to allow the guide plate 52 to deflect outward away from the door track 30. The outward force created by the overhead door 12 and dislodged roller 100 causes the spring 94 surrounding the mounting element 88 closest to the dislodged roller 100 to be compressed more than the spring and mounting element combination located further from the roller 100. The uneven compression of springs 94 causes the effective angle between the guide plate 52 and the horizontal portion 36 of the door track 30 to increase, which allows the dislodged roller 100 and shaft 28 to move further along the roller guide surface 68.

When the dislodged roller 100 approaches the base plate 50, the roller is in direct contact with the retaining ridge 46 connected to the inside wall 40 of the door track. As shown in FIG. 5, the angle between the guide plate 52 and the door track 30 continues to force the dislodged roller 100 toward the door track 30, until the roller 100 reaches the position of gap 98 formed in the retaining ridge 46. At this time, the dislodged roller 100 continues to travel along the roller guide surface 68 until it reaches the base plate 50, which acts to force the dislodged roller 100 through gap 98 and back into the door track 30. With the wheel reinserted in the door track 30, the spring 94 and mounting element 88 combination returns the reinsertion bracket 10 to the resting position shown in FIG. 4 and the dislodged wheel 100 is again properly positioned within the door track 30.

When all of the rollers 26 are properly positioned within the door track 30, the top edge 58 of the base plate 50 acts as a retaining ridge for the removed portion of retaining ridge 46 which defines gap 98. Without the top edge 58 acting as the retaining ridge, the rollers would continually become disengaged from the wheel track at this position.

While the operation of the reinsertion bracket 10 is only described for one guide plate 52 of the bracket positioned along the horizontal portion 36 of the door track 30, the reinsertion bracket operates in a likewise manner for the guide plate 51 and the reinsertion bracket 10 mounted along the vertical portion 34 of the door track 30. Discussion of the operation of both the guide plate 51 and the vertically mounted reinsertion bracket 10 will be omitted as it will be duplicative of the discussion above. Although not shown, a similar arrangement is also contained on the door track 30 positioned along the opposite lateral edge of the overhead door 12.

In the preferred embodiment of the invention shown in the figures, the reinsertion bracket 10 includes a pair of guide plates 51, 52; however, it is contemplated by the inventor that a reinsertion bracket having only one guide plate could be used while still operating under the scope of the invention. The inventor also contemplates that an alternative attachment configuration could be used to position the reinsertion bracket 10 along the door track 30 while still operating under the scope of the invention.

The present invention and its advantages will be understood from the foregoing description and it will be apparent that various changes may be made thereto without departing from the spirit and scope of the invention, as defined in the following claims and distinctly claim the subject matter regarded as the invention.

I claim:

1. A system for reinserting a dislodged roller of an overhead door assembly movable in an upward and a downward direction which includes an overhead door having a pair of peripheral edge surfaces parallel to the direction of door movement, each edge surface having a plurality of rollers positioned along its length, and a pair of door tracks, each of which defines an internal space which receives the plurality of rollers and permits the movement of the rollers along the track, each door track defining spaced ends, wherein the dislodged roller is removed from the door track internal space, the system comprising a reinsertion bracket mounted to at least one of the tracks intermediate the door track ends, wherein each reinsertion bracket functions to engage the dislodged roller and reposition the dislodged roller within the door track internal space upon movement of the dislodged roller in either the upward or downward direction past the reinsertion bracket.

2. The system of claim 1, wherein each of the pair of door tracks has a horizontal portion and a vertical portion joined by a curved corner section, and wherein a reinsertion bracket is mounted to each of the horizontal and vertical door track portions.

3. The system of claim 1, wherein each of the reinsertion brackets includes a base plate and a pair of guide plates.

4. The system of claim 3, wherein each guide plate defines an angled roller guide surface for engaging the dislodged roller and guiding it toward the track internal space upon movement of the dislodged roller past the reinsertion bracket.

5. The system of claim 4, wherein the track includes a gap enabling a dislodged roller to pass therethrough into the track internal space, Wherein the guide plate and base plate function to force the dislodged roller through the gap.

6. The system of claim 5, wherein the base plate has a top and bottom edge surface and the base plate is positioned such that the top edge of the base plate extends into the gap.

7. The system of claim 6, wherein the track includes a retaining ridge for maintaining the roller within the track internal space, and wherein a portion of the retaining ridge is removed to define the gap, which is located directly adjacent the top edge of the base plate extending past the edge of the door track.

8. The system of claim 3, wherein each reinsertion bracket is connected to the door track by a resilient deflectable mounting structure.

9. A system for reinserting a roller which becomes dislodged from a movable overhead door assembly which includes an overhead door having a pair of peripheral edge surfaces parallel to the direction of door movement, each edge surface having a plurality of rollers positioned along its length, and a pair of door tracks, each of which defines an internal space which receives the plurality of rollers and permits the movement of the rollers along the track, each door track defining spaced ends, wherein the dislodged roller is removed from the door track internal space, the system comprising at least one reinsertion bracket including a base plate and a guide plate, each reinsertion bracket being mounted to one of the tracks intermediate the door track ends by a resilient deflectable mounting structure comprised of a pair of springs surrounding a pair of mounting elements which are connected to the base plate, wherein each reinsertion bracket functions to reposition the dislodged roller within the door track internal space upon movement of the dislodged roller past the reinsertion device.

10. A bracket for use with an overhead door having a plurality of rollers positioned within a door track, the bracket comprising:

a base plate lying in a first plane, the base plate having a first end and a second end;

a guide plate lying in a second plane, the guide plate having an attachment end joined to the first end of the base plate such that the first plane of the base plate and the second plane of the guide plate form an acute angle; and wherein when a roller becomes disengaged from the door track, the movement of the roller over the guide plate acts to reposition the roller within the door track.

11. The bracket of claim 10, wherein the base plate contains a plurality of mounting holes.

12. The bracket of claim 10, wherein the guide plate has an attachment end of a fixed height corresponding to the height of the base plate and an opposite contact end of a fixed height less than the height of the attachment end.

13. The bracket of claim 12, wherein the guide plate has an angled roller guide surface extending from the contact end to the attachment end.

14. A bracket for use with an overhead door having a plurality of rollers positioned within a door track, comprising:

a base plate lying in a first plane and having a fixed height and a first and a second end, the base plate further including a plurality of mounting holes;

a first guide plate lying in a second plane, the first guide plate having an attachment end joined to the first end of the base plate such that the first plane of the base plate and the second plane of the first guide plate form an acute angle;

a second guide plate lying in a third plane, the second guide plate having an attachment end joined to the second end of the base plate such that the first plane of the base plate and the third plane of the second guide plate form an acute angle;

a plurality of mounting elements passing through the mounting holes contained in the base plate; and a spring surrounding each mounting element to provide a resilient deflectable positioning arrangement between the base plate and the door track.

15. The bracket of claim 14, wherein each of the plurality of mounting elements has a head portion and a shaft portion.

16. The bracket of claim 15, further comprising a mounting block located adjacent to the door track and connected to the base plate by the plurality of mounting elements.

17. The bracket of claim 16, wherein the mounting block has a plurality of mounting element receptacles such that the plurality of springs are positioned within the mounting element receptacles and the springs surround the shaft portion of the mounting elements.

18. The bracket of claim 14, wherein the first and second guide plates have a contact end of a fixed height less than the height of the base plate, and the height of the attachment end of each guide plate is equal to the height of the base plate.

19. The bracket of claim 18, wherein each of the first and second guide plates have an angled roller guide surface extending from the contact end to the attachment end.

20. The bracket of claim 14, wherein the base plate has a top and bottom edge surface wherein the top edge surface of the base plate extends past the inside edge of the door track.

21. A method of reinserting a dislodged roller into an internal space defined by the track of an overhead door assembly, comprising the steps of:

forming a gap in the track having a size sufficient to allow the roller to pass into the track internal space;

mounting a reinsertion device to the track adjacent the gap; and moving the door in either an upward or downward direction so as to move the dislodged roller toward the gap, wherein the reinsertion device functions to guide the dislodged roller into and through the gap into the track internal space upon movement of the door in either an upward or downward direction.

22. A bracket for use with an overhead door having a plurality of rollers positioned within a door track, the bracket comprising:

a base plate having a fixed width and a first and a second end;

a first guide plate having an inner end joined to the first end of the base plate, an outer end of a fixed width less than the width of the inner end, and an angled roller guide surface extending from the outer end to the inner end; and a second guide plate having an inner end joined to the second end of the base plate, an outer end of a fixed width less than the width of the inner end, and an angled roller guide surface extending from the outer end to the inner end.

23. A roller reinsertion system for an overhead door assembly including a door, a track defining an internal space and including a lip overlying the internal space, and a series of rollers mounted to the door and normally disposed within the internal space, comprising:

a gap formed in the lip; and a roller reinsertion member secured to the track and including an angled roller engagement surface defining a proximal end adjacent the gap and a distal end spaced from the proximal end, wherein the roller reinsertion member and the angled roller engagement surface are positioned relative to the track such that, upon movement of the door relative to the track, a roller dislodged from the track internal space engages the roller engagement surface adjacent its distal end and moves along the roller engagement surface toward its proximal end and is guided thereby to a position in which the roller passes through the gap and into the track internal space.

24. The system of claim 23, wherein the roller reinsertion member is positioned relative to the track such that the proximal end of the roller engagement surface overlies the lip.

25. The system of claim 23, wherein the roller reinsertion member includes a central base portion and a pair of roller engagement surfaces extending in opposite direction therefrom.

* * * * *